United States Patent [19]

Rogers

[11] Patent Number: 5,131,497
[45] Date of Patent: Jul. 21, 1992

[54] VEHICLE FLUID EVACUATION MECHANISM

[76] Inventor: Roy K. Rogers, 26575 Barns, Roseville, Mich. 48066

[21] Appl. No.: 582,268

[22] Filed: Sep. 13, 1990

[51] Int. Cl.⁵ ............................................. F16C 3/14
[52] U.S. Cl. ................................. 184/1.5; 15/304; 137/590; 141/65
[58] Field of Search ............... 184/1.5, 106, 105.3; 141/347, 368, 346, 65, 266; 383/901, 904; 137/590; 15/304; 134/167 R, 168 R

[56] References Cited

U.S. PATENT DOCUMENTS

| | | | |
|---|---|---|---|
| 1,402,565 | 1/1922 | Bruhn | 137/590 |
| 1,432,259 | 10/1922 | Richards | 137/590 |
| 2,018,284 | 10/1935 | Schweitzer et al. | 134/167 R |
| 2,533,202 | 12/1950 | Sturtevant | 383/904 |
| 3,797,538 | 3/1974 | Mollura | 141/368 |
| 3,858,686 | 1/1975 | Luterick | 184/1.5 |
| 3,867,999 | 2/1975 | Cox | 184/1.5 |
| 3,985,572 | 10/1976 | Petermann et al. | 134/167 R |
| 3,991,854 | 11/1976 | Tilley | 184/1.5 |
| 4,033,432 | 7/1977 | Bernstein | 184/1.5 |
| 4,109,686 | 8/1978 | Phillips | 141/347 |
| 4,207,934 | 6/1980 | Scremin et al. | 141/347 |
| 4,354,536 | 10/1982 | Moss | 141/347 |
| 4,373,561 | 2/1983 | Berger | 184/1.5 |
| 4,530,421 | 7/1985 | Balch | 184/1.5 |
| 4,949,765 | 8/1990 | Creeron | 141/65 |

Primary Examiner—Allen M. Ostrager
Assistant Examiner—Alan B. Cariaso
Attorney, Agent, or Firm—Peter A. Taucher; David L. Kuhn

[57] ABSTRACT

The invention is a mechanism for removing a liquid such as oil or transmission fluid from an enclosed cavity of a motor vehicle. The invention includes a tube slidable through the sealing plug of the compartment and a flexible bladder into which one end of the tube can be fit. A shut-off valve in the tube controls the flow of liquid from the compartment to the bladder. The invention optionally includes a simple hand operated pump in the tube and a device to prevent the tube from unintentionally being removed from the plug.

8 Claims, 2 Drawing Sheets

5,131,497

VEHICLE FLUID EVACUATION MECHANISM

GOVERNMENT INTEREST

The invention described herein may be manufactured, used, and licensed by or for the U.S. Government for governmental purposes without payment to me of any royalty thereon.

BACKGROUND AND SUMMARY

Motorized vehicles periodically need various liquids such as oil, radiator coolant or transmission fluid replaced as a matter of normal maintenance procedure. Often it is necessary to raise the vehicle on a hydraulic lift to access ports of vehicle enclosures where the liquid is stored. Typically, the port is in a zone that is crowded with other vehicle components, so that the port's closure mechanism is hard to reach with tools. In many cases vehicle engines and transmissions are in enclosed, compact compartments having little room for drain basins to catch fluids when ports of vehicle compartments are opened.

My invention is an improved mechanism for removing fluid from a vehicle compartment and transferring it directly to a storage bladder. The bladder is flexible so that it can be maneuvered in crowded vehicle spaces to a point near the appropriate port. The invention comprises an extendable tube protruding from the sealing plug of a vehicle compartment such as an engine oil pan, the exposed end of the tube sealingly fitting into a flared opening of the bladder. The tube has a hand-operable valve for controlling the flow of liquid from the vehicle compartment and has means for preventing the accidental removal of the tube from the plug. Because of the maneuverable, flexible bladder and the extendable tube and the hand operable valve, it is contemplated that oil, transmission fluid, or other liquids can be removed from various vehicle compartments without the use of a lift or hand tools.

DETAILED DESCRIPTION

Figure 1:
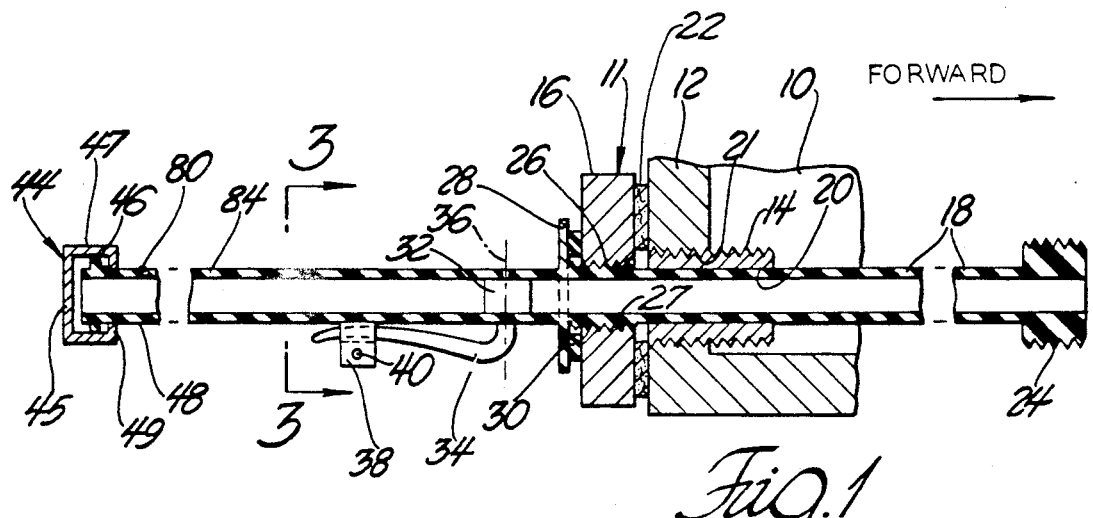
FIG. 1 is a partial sectional view of a vehicle oil pan having a sealing plug, a tube through the sealing plug and a valve in the tube.

Shown in FIG. 1 is a sectional view of fluid evacuation mechanism as adapted for draining oil from oil pan 10 of a vehicle engine. The mechanism includes a generally bolt-shaped plug 11 extending through the lower portion of oil pan sidewall 12, plug 11 having a threaded shaft 14 and having a head 16 of preferably a hexagonal shape. Sidewall 12 has threads in its aperture 21 that accomodate shaft 14 so that shaft 14 threadingly engages sidewall 12. A flexible tube 18 extends through the plug and fits snugly against inner wall 20 of plug 11 so that oil in pan 10 is inhibited from leaking through plug 11 along the outside of tube 18. Between head 16 and sidewall 12 is a flexible annular gasket 22 which prevents oil from leaking past plug 11 when plug 11 is tightened to sidewall 12.

Optionally, tube 18 may have have external threads at 26 matable with internal threads 27 in head 16. The portion of tube 18 having external threads 26 can be screwed into head 16 until annulus 28 compresses seal 30 against head 16. Seal 30 will then prevent leakage of oil through plug 11 along the outside of tube 18. If threads 26 of the tube are disengaged from threads 27 of the plug, then tube 18 can slide outward from the plug.

The portion of tube 18 which is inside oil pan 10 has an enlarged, threaded end 24. End 24 is open and the threads of end 24 are complimentary to the threads of aperture 21 defined by sidewall 12. When the plug is removed from sidewall 12, end 24 can be passed into or from oil pan 10 by screwing it through sidewall 12. Once end 24 is within oil pan 10, end 24 can not be inadvertently removed by pulling on the portion of tube 18 outside oil pan 10.

The portion of tube 18 outside of oil pan 10 has a shut off valve 32 within the tube and a valve handle 34 outside the tube, the handle being shown in the position where the valve is closed. The handle is located so as to prevent it from being knocked to an open position by objects passing under oil pan 10 during travel of the vehicle (not shown) where the oil pan is installed. For the purpose of choosing the location of the handle, it is contemplated that the front of the vehicle will be to the right in FIG. 1 and that objects over which the oil pan passes during vehicle travel will be below the oil pan in FIG. 1. It can thus be seen that the oil pan extends further downward than handle 34, and that handle 34 is immediately behind oil pan 10. The oil pan will therefore protect handle 34 from objects over which the vehicle passes in the forward direction.

Figure 3:
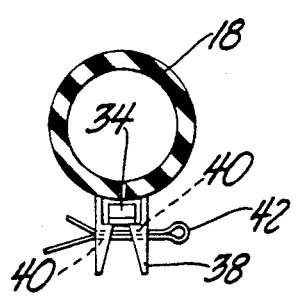
FIG. 3 is a view taken along line 3—3 in FIG. 1 showing details of a bracket assembly for retaining the handle of the valve in the tube.

As previously noted, handle 34 is shown in its closed position in FIG. 1. Handle 34 is flexible and can be bent downward from its undeformed configuration in FIG. 1 so that the free end of the handle clears bracket 38. Handle 34 can then be swung about axis 36 to an open position. The location of axis 36 at the front of the handle inhibits movement of the handle away from the closed position if the handle is struck by an object from the forward direction. Bracket 38 provides additional protection against movement of handle 34 from its closed position. Bracket 38 may have apertures 40 through which a keeper device such as a cotter pin 42 (FIG. 3) may be inserted to retain handle 34 in bracket 38.

The external end 48 of tube 18 has a terminal annulus 46 and is protected by an elastically deformable, removable cap 44. Cap 44 includes an end wall faced against the exterior end of tube 18 and includes a circular primary flange 47 sealingly engaging terminal annulus 46. A secondary flange 49 extends radially inwardly from primary flange 47, the secondary flange being on the opposite axial side of terminal annulus from end wall 45.

Figure 4A:
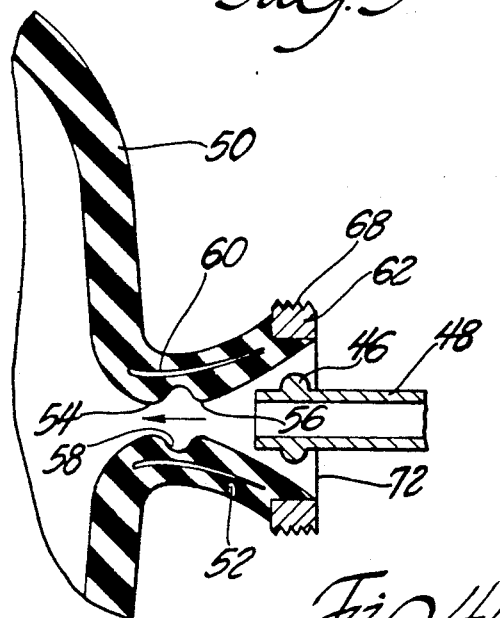
FIGS. 4A and 4B are sectional views showing details of the opening of a bladder for receiving oil.
Figure 5:
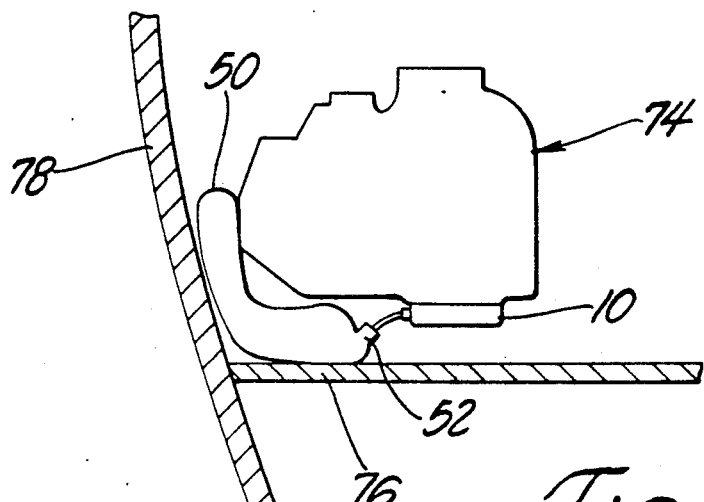
FIG. 5 is an engine compartment with my invention therein.

When cap 44 is taken off of tube 18, end 48 may be inserted into a flexible bladder, which is shown at 50 in FIGS. 4A and 5. As shown in FIG. 4A, bladder 50 has a flared opening 52 for receiving end 48, the flared opening having regions 54 and 56 where the diameter is smaller than the outer diameter of end 48. Regions 54 and 56 are made of flexible, elastomeric material and will interferingly seal against end 48 when end 48 is inserted into flared opening 50. For the sake of design simplicity, it is preferred that all of bladder 50 be of the same material as regions 54 and 56. Regions 54 and 56 define between them an annular groove 58 into which terminal annulus 46 will closely or interferingly fit so as to retain tube 18 in flared opening 52.

Elongate stiffening members 60 may be embedded in flared opening 52 to inhibit axial elongation or compression of the flared opening. The stiffening members will, however permit diametrical expansion of the flared opening when tube 18 is inserted therein. Optionally, a stiff reinforcing ring 62 will be at the mouth of flared opening 52. It is contemplated that a person desiring to insert tube 18 into flared opening 52 will first grip the reinforced mouth of flared opening 52 between the thumb and forefinger. Reinforcing ring 62 prevents flared opening from collapsing due to the force of the grip, thereby avoiding difficulty in inserting tube 18.

Figure 4B:
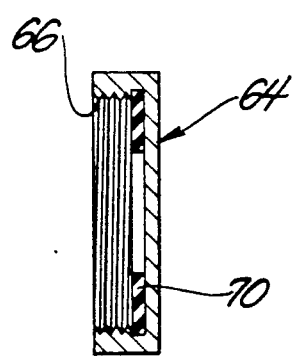

In FIG. 4B is shown closure device 64 for bladder 50, device 64 having internal threads 66 complimentary to threads 68 on reinforcing ring 62. Device 64 additionally has elastomeric ring 70 for sealing against axial surface 72 when device 64 is screwed onto bladder 50.

Shown in FIG. 5 is engine assembly 74 having oil pan 10 wherein access to the oil pan is limited by deck panel 76 and hull member 78. The bladder's flexibility allows it to be maneuvered to oil pan 10 so that flared opening 52 is near the plug of the oil pan, thereby facilitating transfer of oil from the oil pan to the bladder. FIG. 5 shows bladder 50 in a partly full condition, after it has received all the oil from oil pan 10. Bladder 50 retains enough flexibility to be maneuvered out of the relatively enclosed area defined by deck panel 76, hull member 78 and engine assembly 74. For this reason it may be preferred that bladder 50 have a greater volumetric capacity than the compartments from which it will receive vehicle fluid.

Figure 2:
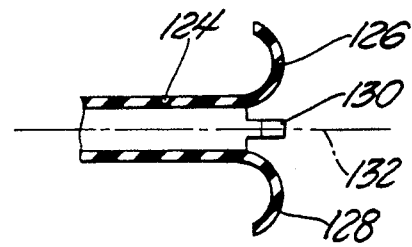
FIG. 2 shows an alternate design for the end of the tube inside the oil pan.

FIG. 2 shows an optional replacement for threaded end 24 disposed inside oil pan 10 in FIG. 1. The optional replacement comprises an interior tube end 124 having individual flexible prongs 126, 128 and 130 extending therefrom. To insert interior tube end 124 into oil pan 10, the prongs are bent inward toward axis 132. Subsequently, end 24 can be forced through the plug along inner wall 20 and thence into the oil pan. The prongs will resume a substantially radial orientation once they are clear of the plug and will resist being pulled back through the plug.

Figure 6:
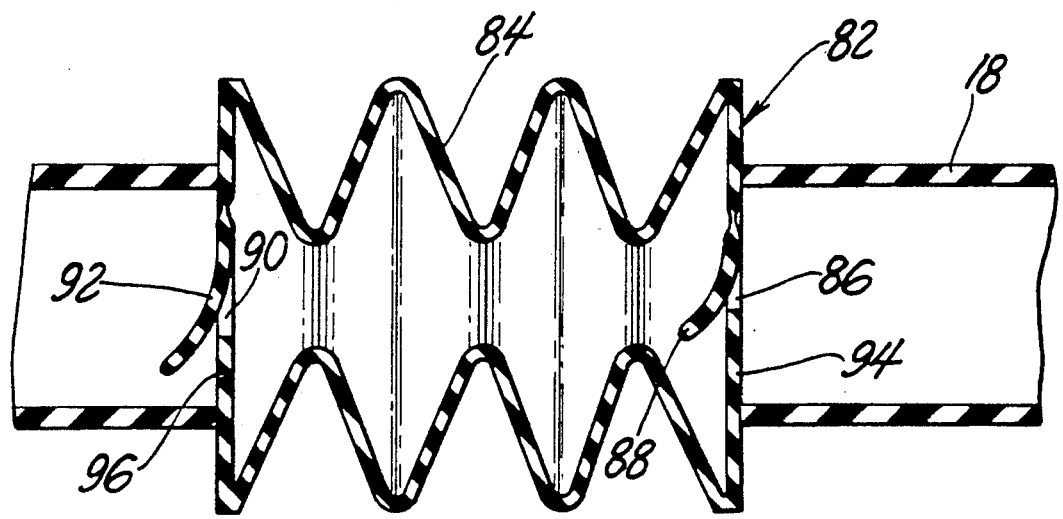
FIG. 6 shows a pump which optionally may installed in the tube.

FIG. 6 shows a simple pump assembly 82 that can be placed in tube 18 to assist in the transfer of oil from oil pan 10 to bladder 50, the pump assembly locatable between points 80 and 84 in FIG. 1. The pump includes a bellows 84 having end walls 94 and 96. End wall 94 is on the intake side of the pump and defines an intake port 86 communicating with the oil pan. End wall 96 defines outflow port 90 which communicates with exterior end 48 of tube 18. At the downstream side port 86 is a flexible cover 88 biased toward the right in FIG. 6 toward a position where cover 88 closes port 86. Likewise, at the downstream side of port 90 is another flexible cover 92 biased to the right toward a position where cover 92 closes port 90. When bellows 84 is expanded, pressure in the portions of tube 18 upstream and downstream of pump 82 have greater pressure than that in pump assembly 82. The greater pressure in tube 18 causes cover 92 to close port 90 and causes cover 88 to open port 86, so that oil is drawn into the bellows only from the side of the pump assembly communicating with the oil pan.

When the bellows are contracted there is greater pressure in pump assembly 82 than in the portions of tube 18 connected thereto. The greater pressure in pump assembly 82 causes cover 92 to open port 90 and causes cover 88 to close port 86, so that oil is expelled only from the side of the pump assembly communicating with external end 48 of tube 18. Repeated expansions and contractions of bellows 84 will pump all of the oil from pan 10 to bladder 50.

I wish it to be understood that I do not desire to be limited to the exact details of construction shown and described herein since obvious modifications will occur to those skilled in the relevant arts without departing from the spirit and scope of the following claims.

What is claimed is:

1. A mechanism for removing liquid from an enclosed compartment, comprising:
   a removable plug in a wall of the compartment, the plug having a lengthwise passage therethrough;
   a fluid transfer tube through the passage, the tube having an interior end within the compartment and an exterior end outside the compartment;
   a valve in the tube having means extending outside the tube for opening and closing the valve;
   flexible curved prongs extending radially away from the interior end of the tube.

2. The mechanism of claim 1 further including a tube portion between the interior end and the valve, the tube portion closely and slidably fit in the passage.

3. The mechanism of claim 2 wherein the exterior of the plug seals with the wall.

4. A mechanism for removing liquid from an oil pan compartment of a motorized vehicle having a forward vehicle end, a rearward vehicle end, an upper vehicle side and a lower vehicle side, the mechanism further comprising:
   a removable plug in a sidewall of the compartment, the plug having a passage therethrough;
   a tube slidably disposed through the passage;
   an interior tube portion within the compartment;
   an exterior tube portion outside the compartment, the exterior tube portion extending rearwardly of the vehicle from the compartment;
   a valve at the rear of the compartment in the exterior tube portion;
   control means at least partly outside the exterior tube portion for opening and closing the valve, the control means comprising an elongate handle having open positions and closed positions, the handle in the closed positions being in a plane parallel to a longitudinal axis of the exterior tube portion;
   safety means for preventing objects over which the vehicle passes from moving the handle from any of the closed positions to one of the open positions, the safety means including
   a pivot axis of the handle at the forward end of the handle, whereby the objects when striking the handle will tend to move the handle to one of the closed positions,
   a shielding portion of the compartment disposed in front of and lower than the handle, whereby the shielding portion deflects the objects approached by the handle,
   lock means to limit pivoting of the arm about the pivot axis from a first closed position in which the arm is disposed along the exterior tube portion, and means for biasing the arm from a second closed position wherein the arm is swung away from the exterior tube portion toward the first closed position.

5. The mechanism of claim 4 wherein the biasing means is at least a portion of the arm which flexes such that the arm is a cantilever spring.

6. The mechanism of claim 4 further comprising:
a terminal annulus at an external end of the external tube portion;
a flexible bladder defining a flared opening for receiving the external end;
a rigid reinforcing ring incorporated in a mouth of the flared opening;
stiffening means for inhibiting axial elongation and compression of the flared opening while permitting diametrical expansion of the flared opening, the stiffening means including elongate members embedded at the periphery of the flared opening disposed generally parallel to an axis of the flared opening;
a radial boss on an inner peripheral surface of the flared opening interferingly engagable with the terminal annulus;
the inner peripheral surface defining a radial channel parallel to the radial boss and deeper within the flared opening than the radial boss, the channel sealingly engagable with the terminal annulus.

7. A mechanism for removing liquid from an enclosed compartment, comprising:
a removable plug in a sidewall of of the compartment, the plug having a passage therethrough;
a tube slidably disposed through the passage;
an interior tube portion within the compartment;
an exterior tube portion outside the compartment, the exterior portion extending rearwardly of the vehicle from the compartment;
a valve in the exterior tube portion;
a terminal annulus at an external end of the external tube portion;
a flexible bladder defining a flared opening for receiving the external end;
means to prevent constriction of the flared opening comprised of a rigid reinforcing ring incorporated in a mouth of the flared opening;
stiffening means for inhibiting axial elongation and compression of the flared opening while permitting diametrical expansion of the flared opening, the stiffening means including elongate members embedded at the periphery of the flared opening disposed generally parallel to an axis of the flared opening;
a radial boss on an inner peripheral surface of the flared opening interferingly engagable with the terminal annulus;
the inner peripheral surface defining an annular channel parallel to the radial boss and deeper within the flared opening than the radial boss, the channel sealingly engagable with the terminal annulus.

8. The mechanism of claim 7 wherein:
the sidewall of the compartment defines a threaded opening;
the plug has a generally bolt-like configuration comprised of a head and a shank attached to the head, the plug having external plug threads engaging the threaded opening;
the plug defines a passage therethrough;
the passage defines internal threads;
the tube has an interior tube portion within the compartment and an exterior tube portion extending outside the compartment;
the tube has exterior tube threads on the exterior tube portion complimentary to the internal threads of the passage;
the external tube portion includes an outer annulus having a surface face toward the head;
a ring-like seal is disposed between the outer annulus and the head;
wherein rotating the tube in one annular direction causes the ring-like seal to be compressed between the outer annulus and the head.

* * * * *